(12) United States Patent
Yen

(10) Patent No.: US 7,614,591 B2
(45) Date of Patent: Nov. 10, 2009

(54) DISPLAY WITH FOLDABLE BASE

(75) Inventor: Ching-Hui Yen, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 504 days.

(21) Appl. No.: 11/346,445

(22) Filed: Feb. 3, 2006

(65) Prior Publication Data

US 2006/0175514 A1 Aug. 10, 2006

(30) Foreign Application Priority Data

Feb. 5, 2005 (TW) .............................. 94104122 A

(51) Int. Cl.
*G06F 1/00* (2006.01)
(52) U.S. Cl. ....................................... 248/150; 361/681
(58) Field of Classification Search ................. 248/150, 248/917, 919–923; 361/681, 682
See application file for complete search history.

(56) References Cited

U.S. PATENT DOCUMENTS 6,437,975 B1 * 8/2002 Huang ......................... 361/681
6,712,321 B1 * 3/2004 Su et al. ................. 248/123.11
7,124,984 B2 * 10/2006 Yokouchi et al. ......... 248/125.8
7,336,479 B2 * 2/2008 Liu et al. ..................... 361/681
7,338,019 B2 * 3/2008 Liu et al. ............... 248/123.11

* cited by examiner

*Primary Examiner*—J. Allen Shriver, II
*Assistant Examiner*—Steven M. Marsh

(57) ABSTRACT

A foldable base is applied to a display to be folded up for easy storage. The foldable base includes a first portion and a second portion, wherein the first portion is pivotably connected to the second portion via a shaft. The main body of the shaft, positioned at a turning space within the foldable base, at least includes a positioning plane and a curved surface. When the first portion is pivoted around the second portion, the main body of the shaft is simultaneously rotated in the turning space. Since the main body of the shaft is physically interfered by the turning space, the first portion of the foldable base can be spontaneously sent back to a first position (such as a start-to-rotate position) or folded up to a second position (such as a storage position) after the first portion is rotated to a certain angle.

26 Claims, 8 Drawing Sheets

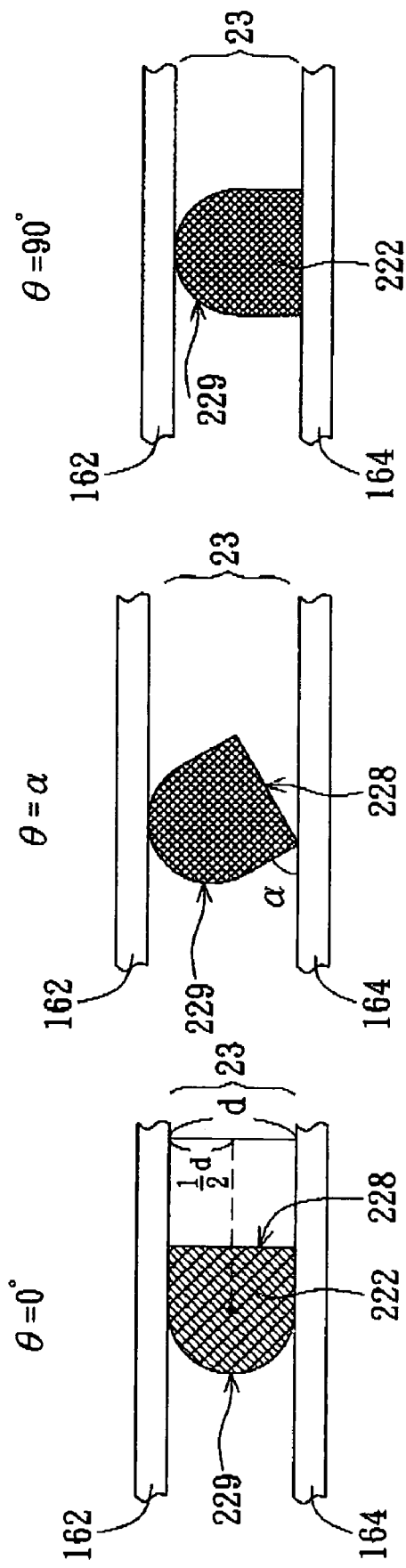

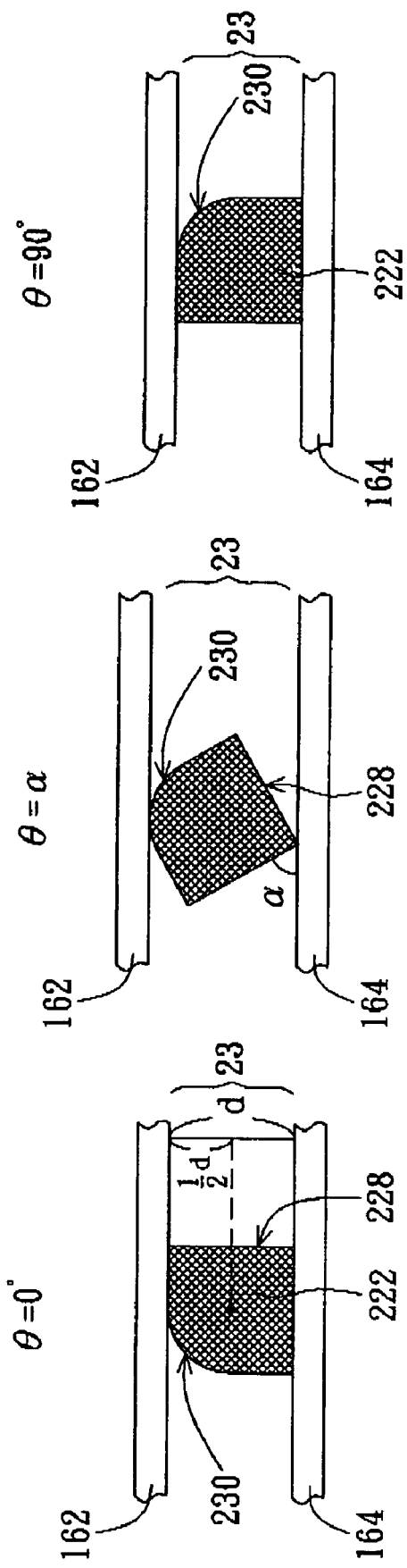

DISPLAY WITH FOLDABLE BASE

This application claims the benefit of Taiwan application Serial No. 094104122, filed Feb. 5, 2005, the subject matter of which is incorporated herein by reference.

BACKGROUND OF THE INVENTION

1. Field of the Invention

The invention relates in general to a display with foldable base, and more particularly to a display with foldable base capable of reducing both the package size and the cost.

2. Description of the Related Art

As the price competition is growing intensified, some of the liquid crystal display (LCD) monitors adopt a foldable or a detachable base to reduce the package size of storage so that the delivery cost can be reduced. However, the display with a detachable base not only requires a longer packaging time but also causes more troubles for the user to do the assembly job. Therefore, most of the displays in the commercial market mainly adopt the foldable base design.

The display mainly includes a base, a supporting arm and a display monitor such as an LCD monitor for instance. The supporting arm is pivotably connected to the base and the display monitor. The supporting arm and the base are normally connected via a hinge mechanism. A positioning mechanism disposed between the supporting arm and the base can be released by the hinge mechanism via a button or buckle design, so that the supporting arm can rotate around the base for the display to be folded up. After being folded up, the final positions of the components of the display are ascertained via a button, a latching mechanism or a pivotal torque operation.

For the convenience of package and delivery, a display monitor is normally rotated backwards to be approximately parallel to the base, so that the storage size of the display is reduced. However, the overall length of the storage package of the folded display has to take the length of the display monitor and the base into consideration, and the overall thickness of the folding storage package has to take the thickness of the display monitor and the height of the base into consideration, Furthermore, the typical designs of mechanically positioning the folded display are very complicated, thus increasing the manufacturing cost.

SUMMARY OF THE INVENTION

It is therefore the object of the invention to provide a display with foldable base, which uses a rotation device for the first portion of the base to pivot around the second portion, so that the package size of the display in the storage or delivery is reduced.

According to an object of the invention, a display at least including a display panel, a supporting arm and a foldable base is provided. The supporting arm connects the foldable base and the display panel. The foldable base at least includes a first portion, a second portion and a rotation device. The first portion can be assembled with and pivoted around the second portion. The rotation device at least includes a shaft having a main body. Two ends of the shaft are respectively connected to the first portion, so that the shaft is rotated when the first portion pivots. The main body, positioned within a turning space of the base, has a positioning plane and a curved surface respectively corresponding to a bottom surface and a top surface of the turning space.

When the first portion of the base is positioned at a first position, the positioning plane of the main body is perpendicular to bottom surface and top surface.

When the first portion of the base is positioned at a second position, positioning plane presses against the bottom surface.

When the first portion of the base is positioned between the first position and the second position, the bottom surface applies a stress to a contact point between the positioning plane and the bottom surface, so that the main body can be rotated with the curved surface towards a direction for receiving the first portion.

Other objects, features, and advantages of the invention will become apparent from the following detailed description of the preferred but non-limiting embodiment. The following description is made with reference to the accompanying drawings.

BRIEF DESCRIPTION OF THE DRAWINGS

FIG. 5A~FIG. 5C schematically illustrate a shaft rotating within the turning space according to an embodiment of the invention; and FIG. 6A~FIG. 6C schematically illustrate a shaft rotating within the turning space according to another embodiment of the invention.

DETAILED DESCRIPTION OF THE INVENTION

Figure 1A:
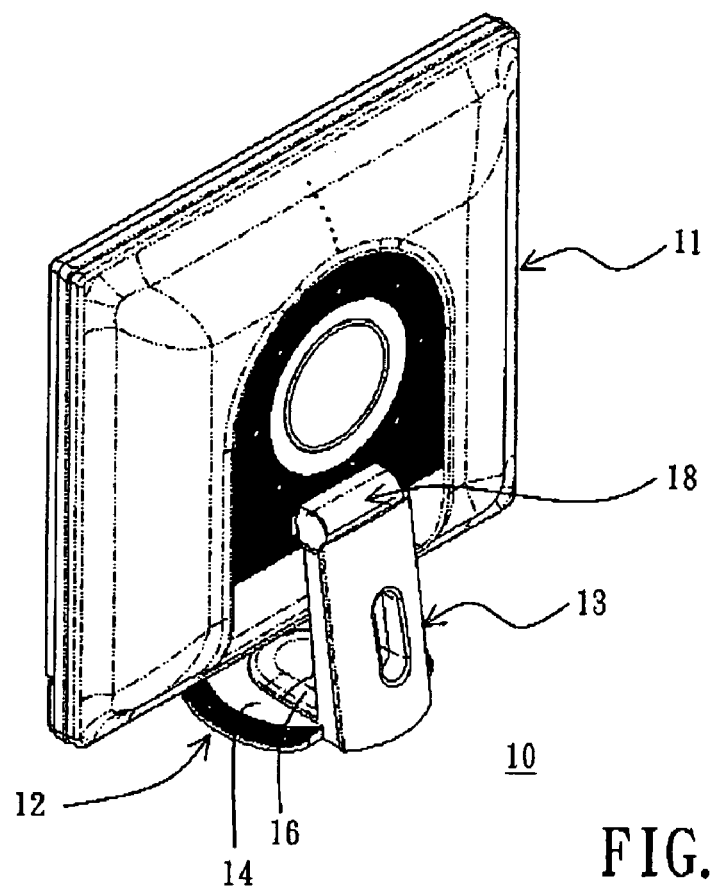
FIG. 1A and FIG. 1B are diagrams of a display with foldable base according to the preferred embodiment of the invention.
Figure 1B:
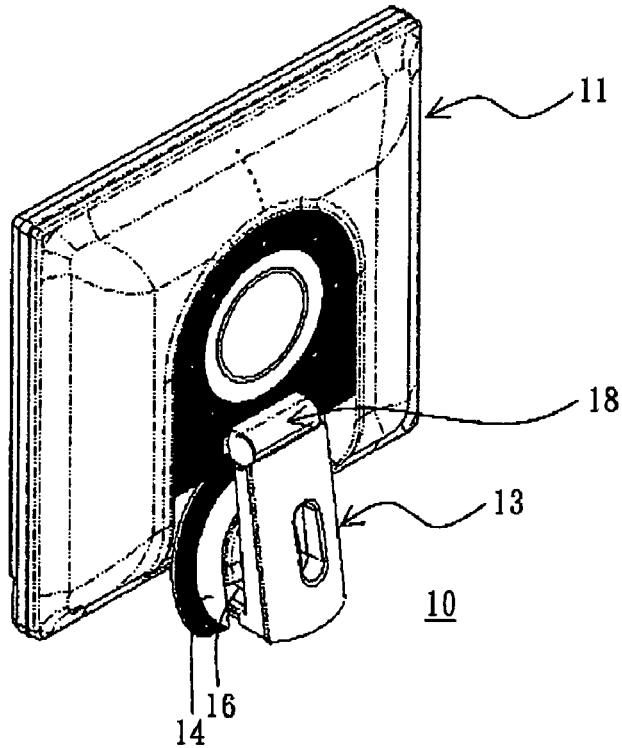

The invention provides a rotation device which mainly includes a shaft, enabling a first portion of a base of a display to pivot around a second portion to reduce the overall package size in the storage. Referring to FIG. 1A and FIG. 1B, diagrams of a display with foldable base according to the preferred embodiment of the invention are shown. The display 10 mainly includes a display panel 11, a base 12 and a supporting arm 13. The display panel 11 can be an LCD monitor for instance. One end of the supporting arm 13 is connected to the base 12, while the other end of the supporting arm 13 is connected to the display panel 11 via a hinge mechanism 18. Through the hinge mechanism 18, the display panel 11 can rotate with respect to the supporting arm 13 for the user to adjust the display panel 11 at a desired viewing angle. According to the invention, a rotation device, such as a shaft for instance, penetrates the second portion 16, and two ends of the rotation device (e.g. the shaft) are connected to the first portion 14. The rotation device allows the pivoting of the first portion 14 of the base 12 on the second portion 16. Details of the rotation device are not shown in FIG. 1A and FIG. 1B, but will be elaborated in the following paragraphs. When the display 10 needs to be packaged and stored, the first portion 14 is rotated upward as shown in FIG. 1B, so that most area (i.e. the first portion 14) of the base 12 is received between the supporting arm 13 and the display panel 11. Compared with the conventional method of folding the display to be parallel to the base, the display with the foldable base of the invention has a smaller package size after having been folded, thus saving the storage space and reducing the delivery cost.

The invention is further elaborated in a preferred embodiment. However, the scope of protection of the invention is not limited to the components disclosed in the embodiment. Besides, in order to highlight the characteristics of the technology of the invention, the components not crucial to the invention are omitted in the drawings. For example, the display monitor is omitted. Accordingly, the specification and the drawings are to be regarded as an illustrative sense rather than a restrictive sense.

Figure 2:
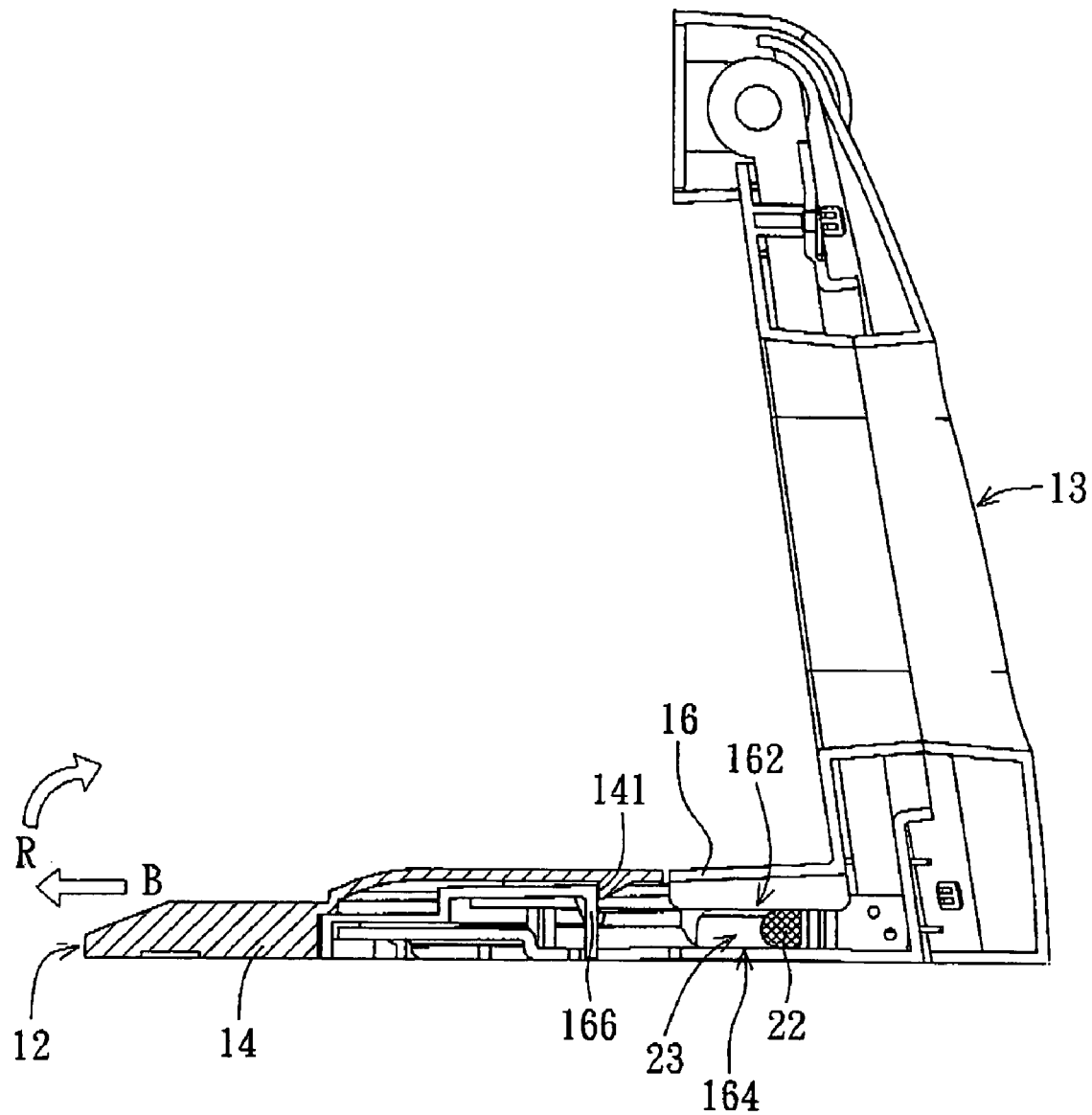
FIG. 2 is a cross-sectional view of a display base and a supporting arm according to a preferred embodiment of the invention.

FIG. 2 is a cross-sectional view of a display base and a supporting arm according to a preferred embodiment of the invention. The components common to FIG. 1A and FIG. 1B retain the same numeric designation. In the preferred embodiment, the first portion 14 of the base 12 is designed to be an outer ring which can be pivotably assembled with the second portion 16 via a rotation device. The rotation device of the embodiment at least includes a shaft 22 whose two ends are connected to the first portion 14. The pivoting of the first portion 14 on the second portion 16 can be done through the shaft 22. Also, rotation of the first portion 14 simultaneously turns the shaft 22 around.

Figure 3:
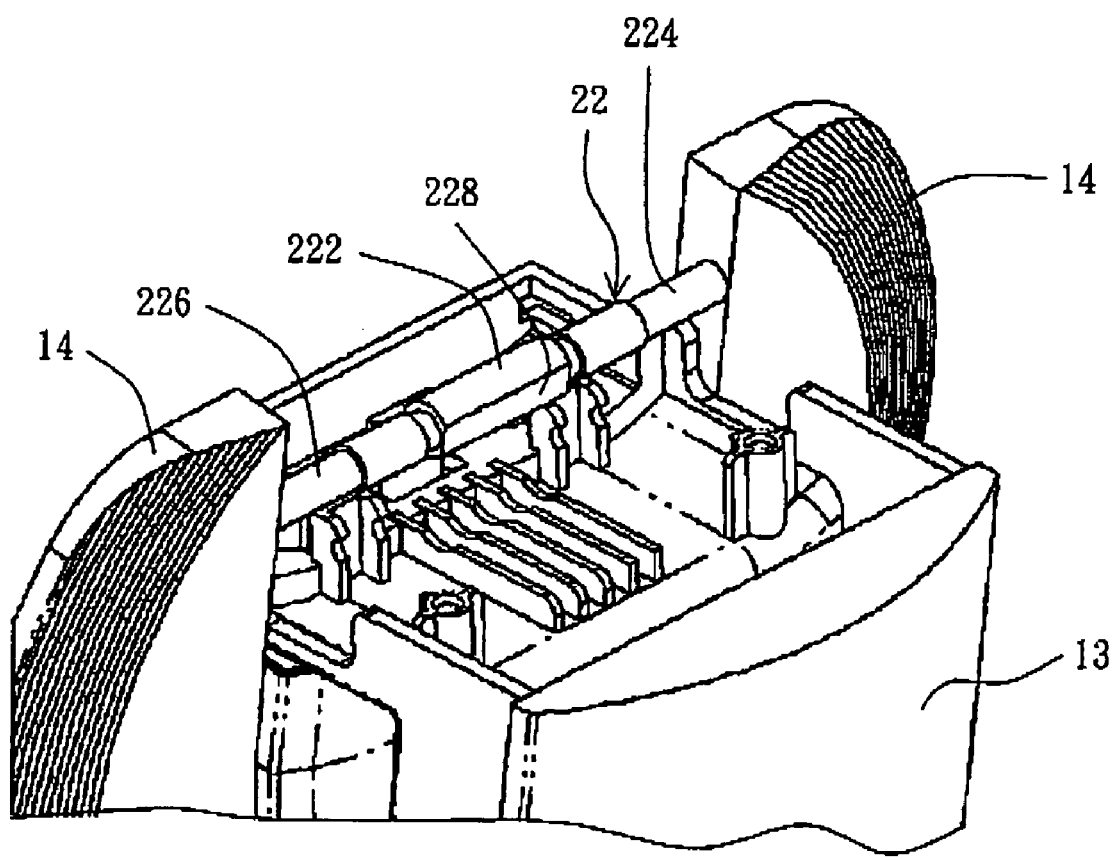
FIG. 3 is a diagram of a shaft according to a preferred embodiment of the invention.

Referring to FIG. 3, a diagram of a shaft according to a preferred embodiment of the invention is shown. A main body 222 of the shaft 22 is rotated or moved within a turning space 23 of the second portion 16 of the base 12. An upper housing and a lower housing of the second portion 16 respectively provide a top surface 162 and a bottom surface 164, and the clearance between the top surface 162 and the bottom surface 164 is so called as the turning space 23 for the shaft 22. In the practical application, the top surface 162 and the bottom surface 164 of the second portion 16 of the base 12 can be made of different materials. For example, the top surface 162 and the bottom surface 164 can be made of plastics and metal plate, respectively. The material is not subject to any specific restriction. Any material enabling the turning space 23 to physically interfere with the shaft 22 in rotation would do.

To clearly illustrate the shape of the shaft 22 and its relative relationship with other mechanical components, the lower housing of the first portion 14 is omitted in FIG. 3. The shaft 22 at least includes a main body 222, a first connecting portion 224, and a second connecting portion 226. The main body 222 is positioned between the first connecting portion 224 and the second connecting portion 226. The first connecting portion 224 and the second connecting portion 226 are respectively connected to the first portion 14 of the base 12, as shown in FIG. 3. According to the present preferred embodiment, the first connecting portion 224, the second connecting portion 226 and the main body 222 are formed in one piece, while the shaft 22 is preferably formed in one piece with the first portion 14. Therefore, when the first portion 14 of the base 12 pivots around the second portion 16 as shown in FIG. 1B, the shaft 22 simultaneously rotates with the first portion 14. It is noted that the main body 222 of the shaft 22 at least has a positioning plane 228 assembled with other curved surface or plane of the main body 222.

Besides, a positioning device is preferably designed in the embodiment to provide a steadily assembled base 12 when the first portion 14 is united with the second portion 16. In the practical application, the positioning device is released before the pivoting of the first portion 14 on the second portion 16.

Figure 4A:
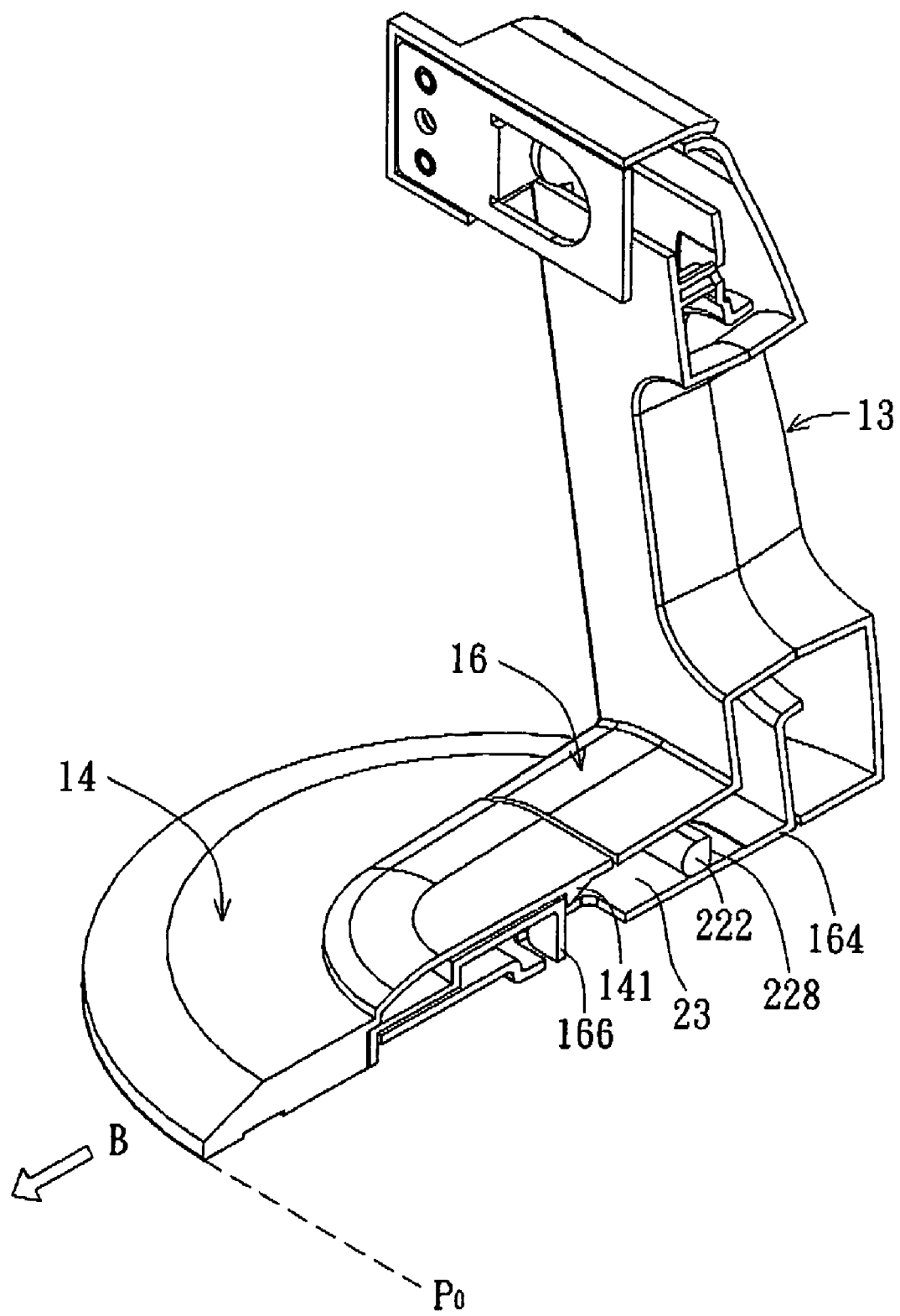
FIG. 4A, FIG. 4B, FIG. 4C schematically show the first portion respectively at the united position, the start-to-rotate position and the storage position according to a preferred embodiment of the invention.
Figure 4B:
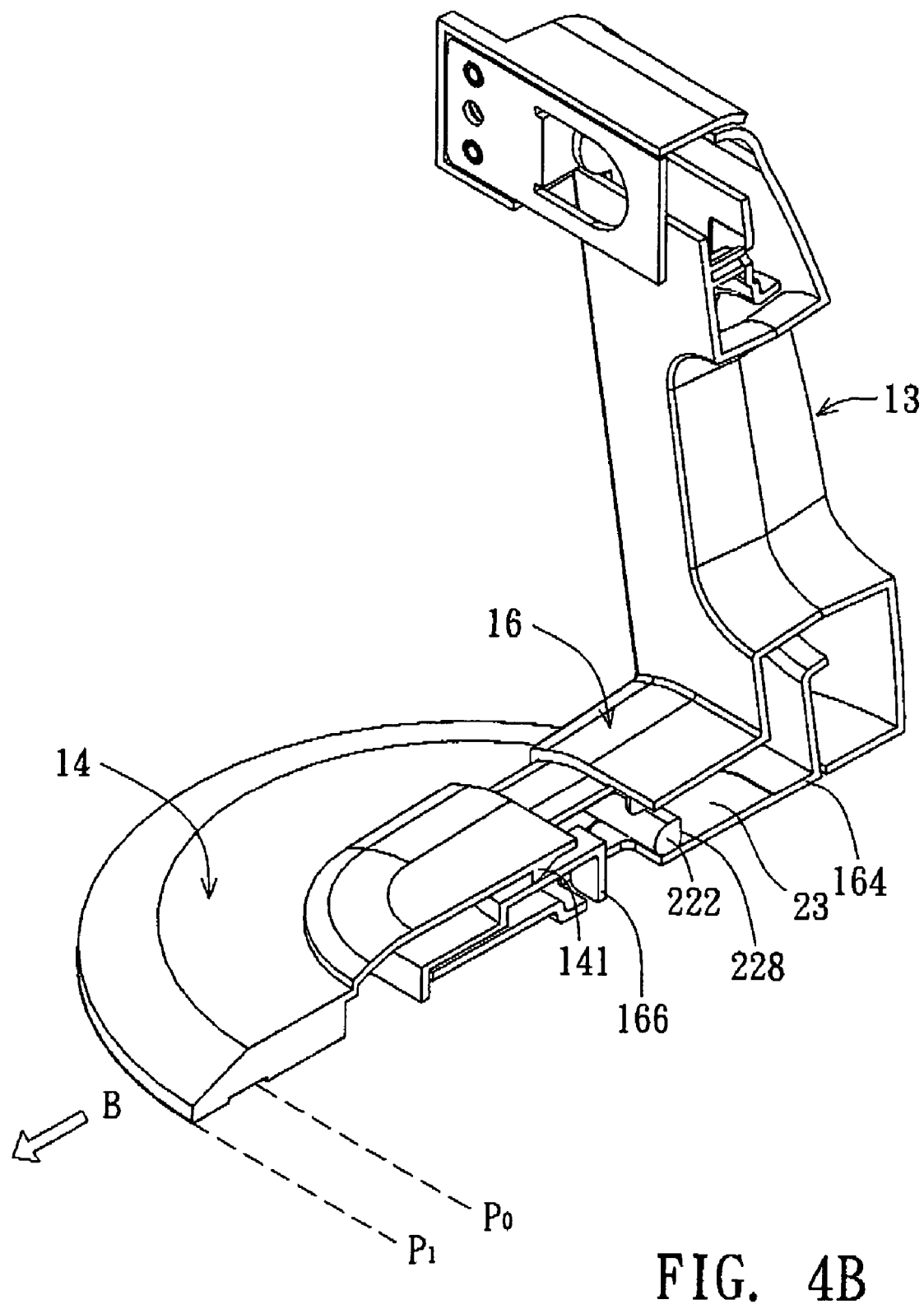
Figure 4C:
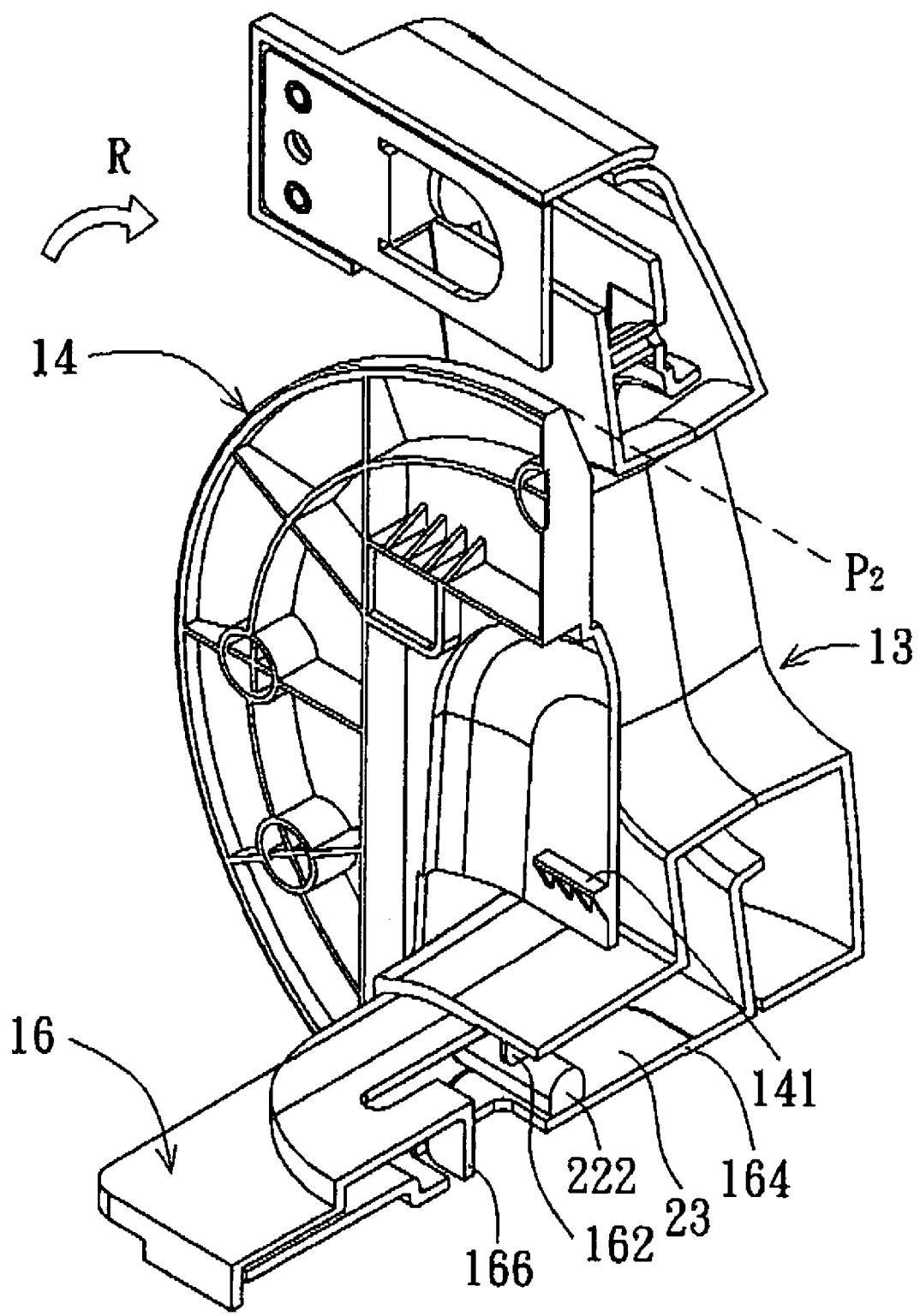

FIG. 4A, FIG. 4B and FIG. 4C schematically show the first portion respectively at the united position, the start-to-rotate position and the storage position according to a preferred embodiment of the invention. In FIG. 4A, a stop bar 141 is formed at the first portion 14, and a barrier wall 166 is formed at the second portion 16 correspondingly. As shown in FIG. 4A, when the first portion 14 of the base 12 is positioned at the united position $P_0$, the stop bar 141 is restrained by the barrier wall 166 so that the first portion 14 cannot be released from the second portion 16. When the base 12 needs to be folded and packaged, an external force is applied to the first portion 14 for detaching the stop bar 141 from the barrier wall 166 first, and moving the first portion 14 along the direction of arrow B next. Due to the connection between the shaft 22 and the first portion 14 as shown in FIG. 3, the shaft 22 is thus spontaneously moved within the turning space 23 (i.e. the clearance between the top surface 162 and bottom surface 164). As shown in FIG. 4B, when the first portion 14 is moved to a first position $P_1$ (also referred as a start-to-rotate position), an external force is applied to rotate the first portion 14 around the second portion 16, and the rotating direction is depicted by the arrow R in FIG. 2 and FIG. 4C. When the first portion 14 is rotated upwards to a second position $P_2$ (also referred as a storage position) as shown in FIG. 4C, this folded display is ready to be stored or delivered in a smaller package.

After the folded display is delivered to somewhere and needs to be used again, the base 12 has to be unfolded. First, the first portion 14 is rotated downwards in the direction opposite to the arrow R until reaching the same horizontal level with the second portion 16. Then, the first portion 14 is moved towards the supporting arm 13, that is the direction opposite to the arrow B. When the stop bar 141 catches the barrier wall 166, that is when the first portion 14 returns to the united position $P_0$, the base 12 is completely unfolded and the display is ready to be used.

Moreover, the first portion 14 and the second portion 16 are preferably to be designed with a slide mechanism (not shown in the figures), facilitating the first portion 14 to slide against the second portion 16 between the united position $P_0$ and the first position $P_1$. The design of the slide mechanism covers a large variety. For example, a slide channel and a rib can be respectively disposed at the first portion and the second portion to facilitate the sliding movement, and no specific restraints are imposed in the present invention.

Besides, the main body 222 of the shaft 22 has a non-circular cross-section, so that a torque is provided for sending the first portion 14 back to the second position $P_2$ (i.e. the storage position of FIG. 4C) or to the first position $P_1$ (i.e. the start-to-rotate position of FIG. 4B) in the course of rotating the first portion 14. FIG. 5A~FIG. 5C schematically illustrate a shaft rotating within the turning space according to an embodiment of the invention. According to the preferred embodiment, the main body of 222 of the shaft 22 has a positioning plane 228 and a half circle surface 229.

Please also refer to both FIG. 4A and FIG. 4B. When the first portion 14 of the base 12 is positioned at the united position $P_0$ or the first position $P_1$ (i.e. the start-to-rotate position), the angle θ contained between the first portion 14 and the second portion 16 is 0 degree. Meanwhile, the positioning plane 228 of the main body 222 is perpendicular to the bottom surface 164 and the top surface 162 of the turning space 23, as shown in FIG. 5A.

When the first portion 14 reaches the first position $P_1$ and starts to rotate, the shaft 22 rotates simultaneously. When the angle θ contained between the first portion 14 and the second portion 16 equals to α degree as shown in FIG. 5B, the bottom surface 164 physically interferes with the positioning plane 228, thereby causing a stress on the main body 222 of the shaft 22, and forcing the half circle surface 229 to spontaneously rotate towards the top surface 162 or the bottom surface 164 of the turning space 23.

When the first portion 14 rotates to the second position $P_2$ (also referred as the storage position), the contained angle θ between the first portion 14 and the second portion 16 equals 90 degrees as shown in FIG. 5C, and the positioning plane 228 presses against the bottom surface 164 of the turning space 23.

According to the disclosure above, the user only needs to rotate the first portion 14 to an contained angle of α degree, the first portion 14 would spontaneously be rotated to the second position $P_2$ or to the first position $P_1$ due to the stress caused by the physical interference between the shaft 22 of the main body 222 and the bottom surface 164.

According to the preferred embodiment of the invention, the main body 222 of the shaft 22 has a half circle surface 229. Since the second portion 16 rotates within the range of 0 degree~90 degrees in the most application cases, a quarter circle surface can be adopted for constructing the main body 222, and this quarter circle surface is corresponding to the top surface 162 of the second portion 16 during the rotation of the main body 222. As shown in FIGS. 6A~6C, the main body 222 includes a positioning plane 228 and at least a quarter circle surface 230. When the first portion 14 is rotated from 0 degree to 90 degrees, the quarter circle surface 230 also rotates clockwise for 90 degrees, and the positioning plane 228 originally perpendicular to the top surface 162 and the bottom surface 164 is turned to press against the bottom surface 164. Anyone who is skilled in the technology will understand that the shape of the cross-section of the main body 222 is not limited to that shown in FIG. 5A~FIG. 5C, or FIG. 6A~FIG. 6C. For example, the corner of the main body 222 does not necessarily have to be rectangular; an arced surface would do as well. Anyone who is skilled of the technology of the invention can think of all kinds of variations for constructing the applicable cross-section shape of the main body 222.

According to the above embodiment, the first portion 14 is unrotatable at the united position $P_0$ until it is moved to the first position $P_1$. However, anyone who is skilled with the technology of the invention will understand that other rotatable positioning devices can be used for positioning the first portion 14 and the second portion 16, so that the united position and the start-to-rotate position of the first portion 14 are identical in the practical applications.

According to the aforementioned description, with the application of the rotation device of the invention, the overall size of the present folded display is smaller than that of the conventional folded display, thus saving the storage space and reducing the delivery cost. Furthermore, the folding and positioning conditions of the display according to the present invention can be easily achieved via the simple mechanisms, so that the manufacturing cost can be greatly decreased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable base, applied to a display and connected to a supporting arm of the display, the foldable base comprising:
    a first portion;
    a second portion, able to be assembled with the first portion, and the first portion pivotably connected to the second portion; and
    a rotation device, comprising:
        a shaft having a main body, two ends of the shaft connected to the first portion, the shaft rotated when the first portion of the base being rotated, the main body positioned within a turning space of the base, and the main body having a positioning plane and a curved surface respectively corresponding to a bottom surface and a top surface of the turning space,
    wherein when the first portion of the base is positioned at a first position, the positioning plane of the main body is perpendicular to the bottom surface and the top surface;
    wherein when the first portion of the base is positioned at a second position, the positioning plane presses against the bottom surface;
    wherein when the first portion of the base is positioned between the first position and the second position, the bottom surface applies a stress to a contact point between the positioning plane and the bottom surface, so that the main body can be rotated with the curved surface towards a direction for receiving the first portion.

2. The foldable base according to claim 1, wherein the shaft has a first connecting portion, a second connecting portion and the main body, the first connecting portion and the second connecting portion are respectively connected to the first portion of the base.

3. The foldable base according to claim 2, wherein the first connecting portion, the second connecting portion and the main body are formed in one piece.

4. The foldable base according to claim 3, wherein the shaft and the first portion of the base are formed in one piece.

5. The foldable base according to claim 1, wherein the second portion of the base is connected to the supporting arm.

6. The foldable base according to claim 1, wherein the second portion comprises an upper housing and a metal plate respectively functioned as the top surface and the bottom surface of the turning space.

7. The foldable base according to claim 1, wherein when the first portion of the base is positioned at the second position, the first portion is also received at a storage position.

8. The foldable base according to claim 1, wherein when the first portion can be assembled with the second portion to form the base when the first portion reaches a united position.

9. The foldable base according to claim 8, wherein the first portion has a stop bar, when the first portion reaches the united position, the stop bar enables the first portion to be positioned at the second portion.

10. The foldable base according to claim 8, wherein the first portion and the second portion of the base are correspondingly equipped with a slide mechanism, so that the first portion can slide against the second portion between the united position and the first position.

11. The foldable base according to claim 10, wherein the slide mechanism comprises:
    a slide channel positioned at the first portion of the base; and
    a rib positioned at the second portion of the base and corresponding to the slide channel.

12. The foldable base according to claim 1, wherein the curved surface is a quarter circle surface corresponding to the top surface of the turning space.

13. The foldable base according to claim 1, wherein the curved surface is a half circle surface corresponding to the top surface of the turning space.

14. A display, comprising:
a display panel;
a supporting arm; and
a foldable base, connected to the display panel by the supporting arm, and the foldable base comprising:
a first portion;
a second portion, able be assembled with the first portion, and the first portion pivotably connected to the second portion; and
a rotation device, comprising:
a shaft having a main body, two ends of the shaft respectively connected to the first portion, the shaft rotated when the first portion being rotated, the main body positioned within a turning space of the base, the main body having a positioning plane and a curved surface respectively corresponding to a bottom surface and a top surface of the turning space,
wherein when the first portion of the base is positioned at a first position, the positioning plane of the main body is perpendicular to the bottom surface and the top surface;
wherein when the first portion of the base is positioned at a second position, the positioning plane presses against the bottom surface;
wherein when the first portion of the base is positioned between the first position and the second position, the bottom surface applies a stress to a contact point between the positioning plane and the bottom surface, so that the main body can be rotated with the curved surface towards a direction for receiving the first portion of the base.

15. The display according to claim 14, wherein the shaft has a first connecting portion, a second connecting portion and the main body, the first connecting portion and the second connecting portion are respectively connected to the first portion of the base.

16. The display according to claim 15, wherein the first connecting portion, the second connecting portion and the main body are formed in one piece.

17. The display according to claim 14, wherein the shaft and the first portion of the base are formed in one piece.

18. The display according to claim 14, wherein the second portion of the base is connected to the supporting arm.

19. The display according to claim 14, wherein the second portion comprises an upper housing and a metal plate respectively functioned as the top surface and the bottom surface of the turning space.

20. The display according to claim 14, wherein when the first portion of the base is positioned at the second position, the first portion is also received at a storage position.

21. The display according to claim 14, wherein the first portion can be assembled with the second portion to form the base when reaching a united position.

22. The display according to claim 21, wherein the first portion has a stop bar, when the first portion reaches the united position, the stop bar enables the first portion to be positioned at the second portion.

23. The display according to claim 21, wherein the first portion and the second portion of the base are correspondingly equipped with a slide mechanism, so that the first portion can slide against the second portion between the united position and the first position.

24. The display according to claim 23, wherein the slide mechanism comprises:
a slide channel positioned at the first portion of the base; and
a rib positioned at the second portion of the base and corresponding to the slide channel.

25. The display according to claim 14, wherein the curved surface is a quarter circle surface corresponding to the top surface of the turning space.

26. The display according to claim 14, wherein the curved surface is a half circle surface corresponding to the top surface of the turning space.

* * * * *

UNITED STATES PATENT AND TRADEMARK OFFICE
CERTIFICATE OF CORRECTION

PATENT NO.       : 7,614,591 B2  
APPLICATION NO.  : 11/346445  
DATED            : November 10, 2009  
INVENTOR(S)      : Ching-Hui Yen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Fourteenth Day of December, 2010

David J. Kappos  
*Director of the United States Patent and Trademark Office*